United States Patent Office 3,063,997
Patented Nov. 13, 1962

3,063,997
PROCESS FOR PREPARING 1,3-OXAZINE-2,4-DIONES
Emilio Testa, Milan, Italy, assignor to Lepetit S.p.A., Milan, Italy
No Drawing. Filed Oct. 16, 1958, Ser. No. 767,520
Claims priority, application Great Britain July 23, 1957
5 Claims. (Cl. 260—244)

The present invention relates to new chemical compounds and to a process for preparing them.

More particularly the invention is concerned with new pharmacologically useful chemical compounds having the general formula:

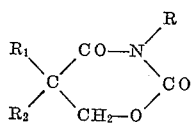

wherein R represents hydrogen or a lower alkyl radical of one to eight carbon atoms inclusive, $R_1$ and $R_2$ are the same or different and represent aryl, alkyl or aralkyl groups or together represent a polymethylene group, and to a process for preparing said compounds.

This application is a continuation-in-part of my copending application Serial No. 748,148 filed July 14, 1958, now abandoned.

As will be apparent to those skilled in organic chemistry, these 5,5-disubstituted tetrahydro-1,3-oxazine-2,4-diones having an asymmetrical carbon atom may exist both in racemic and optically active forms.

The invention extends to all possible forms of the compounds of the general formula presented above.

The compounds of the invention have proved particularly active as sedatives, hypnotics and anticonvulsants on laboratory animals. Some of them are active as central nervous system stimulants, analeptics and convulsants. The compound in which R is n-butyl possesses also diuretic activity. Their toxicity is exceptionally low and they show no untoward side effects on the autonomic nervous system, arterial pressure, heart and respiratory rate.

The compounds of the invention are prepared by bubbling hydrogen chloride into a solution of one mole of an alpha, alpha-disubstituted beta-hydroxypropionic acid (I) and an excess over one mole (and preferably less than two moles) of an alkali metal cyanate in a water immiscible solvent at 0–5° C., refluxing the obtained alpha, alpha-disubstituted beta-carbamyloxypropionic acid (II) with excess thionyl chloride, evaporating the excess thionyl chloride and contacting the residual chloride (III) for 30–60 minutes with anhydrous pyridine at a temperature not exceeding 45° C. The mixture is poured into ice-water and made acidic with hydrochloric acid. The precipitated product may be recrystallised from an appropriate solvent and if desired, converted into the N-alkyl derivative by alkylating agents.

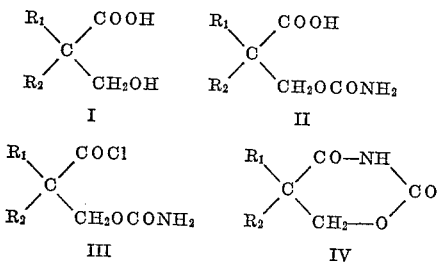

The starting compounds of the invention, that is, the alpha, alpha-disubstituted beta-hydroxypropionic acids and their preparation are described in our copending application Serial No. 731,635 filed April 29, 1958, now abandoned.

By this process, a disubstituted alkyl malonyl-chloride (VI), prepared by the action of thionyl chloride on a disubstituted monoalkyl malonate (V), is hydrogenated to alkyl alpha,alpha-disubstituted β-hydroxypropionate (VII). The ester is then hydrolysed to the free acid (I) by conventional methods.

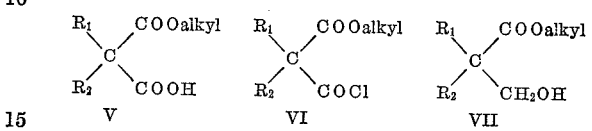

When optically active end compounds are desired, it is preferable to carry out the resolution at the stage of the starting compounds of the invention, that is, the alpha, alpha-disubstituted-beta-hydroxypropionic acids. The resolution is carried out through the (−)-quinine salt according to the usual methods of antipode resolution. The optical antipodes are then worked exactly as described for the racemic compounds.

Of course the optically active compounds may be prepared also by resolving the racemates at different stages of the synthesis or more directly on the end compounds, using known procedures. In any case it is advantageous to effect the resolution on the compounds containing a free carboxyl group through the corresponding salts with the commonly used optically active bases. Moreover, it is known to organic chemists that the resolution is economically more convenient when it is carried out at an early stage of the synthesis rather than on more elaborate intermediate compounds.

The following non-limitative examples illustrate the invention.

EXAMPLE 1

A mixture of 32 g. monoethyl phenylethylmalonate and 25 ml. freshly distilled thionyl chloride is refluxed for 2 hours. The excess thionyl chloride is removed in vacuo and the residue is distilled collecting at 133–135° C. under 2.5 mm. The yield is 30 g. (87%); M.P. 39–40° C.

Into a mixture of 15 g. sodium borohydride and 150 ml. anhydrous dioxane 68 g., of the above prepared alpha-carbethoxy-alpha-phenylbutyryl chloride dissolved in 300 ml. anhydrous dioxane are quickly dropped. The mixture is then refluxed under stirring for 2.5 hrs., then it is cooled.

Five hundred millilitres of ice water are added, taking care not to exceed 25° C., then 10% HCl is added to acidic reaction and the mixture is extracted with ethyl ether. After removing the solvent, the residue is distilled collection at 140–145° C./2–3 mm. Yield 47 g. (80%) of ethyl alpha-phenyl-alpha-hydroxymethylbutyrate.

The above ester (120 g.) is hydrolysed by refluxing it with 2000 ml. 10% sodium hydroxide for 6 hours. After cooling the mixture is extracted with ethyl ether and the extract is discarded. The aqueous layer is made acidic to Congo red with hydrochloric acid and extracted with ethyl ether. After removing the solvent the residual oil crystallises on treatment with petroleum ether. Yield 80 g. (76%); M.P. 94–96° C.

To a well stirred and cooled solution of 30 g. alpha-hydroxymethyl-alpha-phenylbutyric acid in 100 ml. anhydrous chloroform 17.55 g. sodium cyanate are added, then hydrogen chloride is bubbled for 3 hours through the mixture. After an additional hour at room temperature the mixture is filtered and the filtrate evaporated to dryness. The solid on the filter is slurried with water and collected, the insoluble part is combined with the residue from the chloroform filtrate and recrystallised from water. Yield 31 g. (85%) of alpha-carbamyloxymethyl-alpha-phenylbutyric acid, M.P. 169–170° C.

A mixture of 33 g. alpha-carbamyloxymethyl-alpha-phenyl-butyric acid and 50 ml. thionyl chloride is refluxed for 1 hour, then the excess thionyl chloride is removed by heating at 70–80° C. The residue is allowed to stand for about 60 minutes with 150 ml. anhydrous pyridine, taking care that the temperature does not exceed 45° C.

The mixture is then poured into 600 ml. ice water and made acidic with hydrochloric acid. The solid is collected after about 1 hour, dissolved in about 1 litre ethyl ether, the ether solution well washed with water and evaporated to a small volume. On cooling, a white precipitate separates, which is collected and dried. Yield 26 g. (85%) 5-ethyl - 5 - phenyltetrahydro-1,3-oxazine-2,4-dione, M.P. 130–132° C.

EXAMPLE 2

A mixture of 25 g. 5-ethyl-5-phenyltetrahydro-1,3-oxazine-2,4-dione, 12.75 g. anhydrous potassium carbonate 19 g. butyl bromide and 250 ml. acetone is refluxed under stirring for 5 hours, then it is filtered and washed with anhydrous acetone. The combined filtrate and washing are evaporated to dryness in vacuo and the residual oil treated with petroleum ether. A solid formed by some unreacted starting compound results and this is collected. The petroleum ether is evaporated and the residue distilled in vacuo collecting at 125–130° C./1–1.5 mm. Yield 25 g. (80%) of 3-butyl-5-ethyl-5-phenyltetrahydro-1,3-oxazine-2,4-dione.

EXAMPLE 3

A solution is prepared from 70 g. DL-alpha-hydroxymethyl-alpha-phenylbutyric acid (prepared as described in Example 1), 116.8 g. (—)-quinine, 290 ml. hot anhydrous ethanol and 290 ml. warm water. After 24 hours an abundant precipitate forms, which is collected and recrystallised from ethanol-water 1:1. Yield 80 g. (78%) of the (—)-quinine salt of (+)-alpha-hydroxymethyl-alpha-phenylbutyric acid, M.P. 133–134° C., $[\alpha]_D^{20}$ —135.7° (c. 2.1, ethanol).

The quinine salt is suspended in 300 ml. water and treated with 150 ml. 50% sodium hydroxide. The resulting suspension is extracted with ethyl ether and the water layer is acidified with hydrochloric acid and extracted with ethyl ether. This latter extract is dried over sodium sulphate and evaporated in vacuo to dryness. The residual oil crystallises on standing. Yield 26 g. (96%) of (+)-alpha-hydroxymethyl-alpha-phenylbutyric acid, M.P. 80–81° C., $[\alpha]_D^{20}$+11.5° (c. 2, ethanol).

The (—)-antipode is prepared from the filtrate of the first crystallisation of the (—)-quinine salt of the (+)-antipode, by evaporating the filtrate to dryness and decomposing the quinine salt with sodium hydrate. Yield 25 g. (92%) of (—)-alpha-hydroxymethyl-alpha-phenylbutyric acid, $[\alpha]_D^{20}$+11.2° (c. 2, ethanol); M.P. 80–81° C.

(+)-alpha-hydroxymethyl-alpha-phenylbutyric acid is converted into (+)-alpha-carbamyloxymethyl-alpha-phenylbutyric acid which is not isolated in crystalline form. The crude product is treated with thionyl chloride and the obtained acyl chloride converted into (+)-5-ethyl-5-phenyltetrahydro-1,3-oxazine-2,4-dione. All these steps are carried out exactly as described in Example 1 for the racemate. The compound melts at 99–100° C.; $[\alpha]_D^{20}$—152.4° (c. 4, ethanol).

EXAMPLE 4

(—)-alpha-hydroxymethyl-alpha-phenylbutyric acid is treated exactly as described in the preceding example for the dextrorotatory antipode. The obtained (—)-5-ethyl-5-phenyltetrahydro-1,3-oxazine-2,4-dione melts at 99–100° C.; $[\alpha]_D^{20}$+154.9° (c. 0.5).

EXAMPLE 5

5,5-Dimethyl-Tetrahydro-1,3-Oxazine-2,4-Dione

To a solution, previously chilled to 0° C., of 24 g. alpha, alpha-dimethyl-beta-hydroxypropionic acid in 400 ml. chloroform, 18 g. sodium cyanate are added with stirring then hydrogen chloride is bubbled in for 2 hours at 0° C. Nine grams of sodium cyanate are again added and bubbling is continued for additional two hours at 0° C. After 30 minutes at 0° the pasty mass is filtered by suction and the collected crystals are suspended in 350 ml. water and extracted with ethyl ether. The organic layer is separated and the solvent removed. Yield 25 g. (75%) alpha, alpha-dimethyl-beta-carbamyloxypropionic acid; M.P. 173–174° C. (from water).

The above carbamic acid ester (8 g.) is refluxed for 1 hour with 18 ml. thionyl chloride, the excess thionyl chloride is carefully removed by distillation, the residue is mixed with 10 ml. pyridine taking care not to exceed 40° C. and the mixture is allowed to stand for 1 hour at room temperature. It is then poured into 25 g. ice and made acidic to Congo red by the addition of hydrochloric acid. After extraction with ethyl ether and distillation of the solvent the residue crystallises on standing and is recrystallized from ligroin. Yield 5 g. (70%); M.P. 125–127° C.

EXAMPLE 6

5,5-Diethyl-Tetrahydro-1,3-Oxazine-2,4-Dione

Into a mixture of 117.5 g. alpha,alpha-diethyl-beta-hydroxypropionic acid, 90 g. sodium cyanate and 2000 ml. anhydrous chloroform hydrogen chloride is bubbled for 2 hours at 0–5° C. After addition of 45 g. sodium cyanate bubbling is continued for additional two hours at 0–5° C. The solid is collected by suction, suspended in water and extracted with ethyl ether. The solvent is removed in vacuo and the residue recrystallized from water. Yield 95 g. (62%) of alpha, alpha-diethyl-beta-carbamyloxypropionic acid; M.P. 133° C.

Seventy grams of the above carbamic acid ester are heated for 1 hour at 80–90° C. with 120 ml. thionyl chloride. The excess solvent is totally removed in vacuo and the residue is treated with 200 ml. pyridine at 40° for 45 minutes. The mixture is poured in 500 ml. water, made acidic to Congo red with hydrochloric acid and extracted with ethyl ether. The solvent is removed and the residue recrystallized from ligroin. Yield 42 g. (66%); M.P. 97–98° C.

EXAMPLE 7

5,5-Dipropyl-Tetrahydro-1,3-Oxazine-2,4-Dione

Into a mixture of 23 g. alpha, alpha-dipropyl-beta-hydroxypropionic acid, 18 g. sodium cyanate and 400 ml. chloroform, hydrogen chloride is bubbled for 2 hours at 0° C. After addition of 9 g. sodium cyanate bubbling is continued for additional 3 hours at 0–5° C. The solid is collected by suction, suspended in water and extracted with ethyl ether and the solvent is removed in vacuo. Yield 23.5 g. (83%) alpha,alpha-dipropyl-beta-carbamyloxypropionic acid; M.P. 184° C.

Sixteen grams of the ester are heated for 1 hour at 80–90° C. with 40 ml. thionyl chloride. The excess chloride is totally removed in vacuo and the residue is treated with 75 ml. pyridine at 40° for 1 hour. The mixture is poured in 150 ml. ice water, made acidic with hydrochloric acid and extracted with ethyl ether. The solvent is removed and the residue recrystallized from ligroin. Yield 10.5 g. (71%); M.P. 94–95° C.

EXAMPLE 8

5-Methyl-5-Propyl-Tetrahydro-1,3-Oxazine-2,4-Dione

Into a mixture of 18 g. alpha-methyl-alpha-propyl-beta-hydroxypropionic acid, 14 g. sodium cyanate and 370 ml. chloroform hydrogen chloride is bubbled for 3 hours at 0–5° C. The solid is collected by suction and the filtrate is evaporated to dryness. The residual oil is crystallized from water and recrystallized from acetone. Yield 144 g. (60%) alpha-methyl-alpha-propyl-beta-carbamyloxypropionic acid; M.P. 138–140° C.

The ester (6.5 g.) is heated for 1 hour at 80–90° C. with 15 ml. thionyl chloride. After removing the excess chloride the residue is treated with 28 ml. pyridine for 45 minutes at 40° C. The mixture is poured in 75 ml. ice water, made acidic to Congo red with hydrochloric acid and extracted with ethyl ether. The solvent is removed and the residue treated with petroleum ether. The formed crystals are collected. Yield 4.2 g. (70%); M.P. 60–62° C.

EXAMPLES 9 to 11

By the same procedure as described in the Examples 5 to 8 the following oxazines are prepared:

5 - phenyl - 5 - methyl - tetrahydro - 1,3 - oxazine - 2,4-dione.—M.P. 134–135° C. The intermediate alpha-phenyl-alpha-methyl-beta-carbamyloxypropionic acid has M.P. 136–137° C.

5,5-diphenyl - tetrahydro - 1,3 - oxazine - 2,4 - dione.— M.P. 221–222° C. The intermediate alpha,alpha-diphenyl-beta-carbamyloxypropionic acid has M.P. 193–195°.

5,5-tretramethylene-tetrahydro-1,3-oxazine-2,4-dione.— M.P. 105° C. The intermediate 1-carbamyloxy-methyl-cyclo-pentanecarboxylic acid has M.P. 183° C.

EXAMPLE 12

3-Methyl-5,5-Diethyl-Tetrahydro-1,3-Oxazine-2,4-Dione

A mixture of 5 g. 5,5-diethyl-tetrahydro-1,3-oxazine-2,4-dione, 3 g. anhydrous potassium carbonate, 5 g. methyl iodide and 50 ml. anhydrous acetone is refluxed for 5 hours, then it is allowed to stand overnight. The mixture is filtered and the filtrate evaporated to dryness. The residue is treated with petroleum ether and filtered; the filtrate is evaporated to dryness and distilled collecting at 90–95° C. under 0.4 mm. Hg. Yield 3.8 g. (70%).

EXAMPLE 13

3-Methyl-5,5-Diphenyl-Tetrahydro-1,3-Oxazine-2,4-Dione

A mixture of 5 g. 5,5-diphenyltetrahydro-1,3-oxazine-2,4-dione, 3 g. anhydrous potassium carbonate, 5 g. methyl iodide and 50 ml. anhydrous acetone is refluxed for 10 hours and allowed to stand overnight. The mixture is filtered and the filtrate is evaporated to dryness. The residue is recrystallized from ligroin. Yield 3.7 g. (70%); M.P. 123–124° C.

EXAMPLE 14

3,5-Dimethyl-5-Phenyl-Tetrahydro-1,3-Oxazine-2,4-Dione

A mixture of 4 g. 5-phenyl-5-methyl-tetrahydro-1,3-oxazine-2,4-dione, 2.4 g. anhydrous potassium carbonate, 4 g. methyl iodide and 40 ml. anhydrous acetone is refluxed 10 hours and allowed to stand overnight. The mixture is filtered and the filtrate is evaporated to dryness. The residue is dissolved in ethyl ether and filtered; the filtrate is evaporated to dryness and the residue is recrystallized from ligroin. Yield 3 g. (72%); M.P. 90–92° C.

EXAMPLES 15 TO 19

By the procedure described in Examples 14 the following N-substituted oxazinediones were prepared:

3,5 - Dimethyl - 5-propyl-tetrahydro-1,3-oxazine-2,4-dione.—B.P. 106–107° C. under 0.6 mm. Hg.

3,5,5 -Trimethyl - tetrahydro - 1,3-oxazine-2,4-dione.— B.P. 75–80° C. under 0.4 mm. Hg.

3 - Methyl - 5,5-dipropyl-tetrahydro-1,3-oxazine-2,4-dione.—B.P. 85–95° C. under 0.4 mm. Hg.

3 - Methyl-5-phenyl-5-ethyl-tetrahydro-1,3-oxazine-2,4-dione.—M.P. 73–76° C.

3 - Methyl - 5.5-tetramethylene-tetrahydro-1,3-oxazine-2,4-dione.—M.P. 40–44° C.

I claim:
1. A process for preparing a compound of the formula

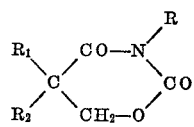

wherein R is a member of the class consisting of hydrogen and lower alkyl radicals, $R_1$ and $R_2$ are members of the class consisting of lower alkyl and phenyl, which comprises bubbling hydrogen chloride into a solution of one mole of an alpha-$R_1$-alpha-$R_2$-beta-hydroxypropionic acid and an excess over one mole of an alkali metal cyanate in a water immiscible solvent at 0–5° C., refluxing the obtained alpha, alpha-disubstituted beta-carbamyloxypropionic acid with excess thionyl chloride, evaporating the excess thionyl chloride, contacting the residue for 30–60 minutes with anhydrous pyridine at a temperature not exceeding 45° C., diluting the mixture with water and adding hydrochloric acid to the mixture to acidic reaction, and recovering the compound of the above formula in which R is hydrogen, which by treatment with a lower alkylating agent yields the compound of the above formula in which R is lower alkyl.

2. A process as claimed in claim 1, wherein the alkali metal cyanate is sodium cyanate.

3. A process as claimed in claim 1, wherein the water immiscible solvent is chloroform.

4. A process as claimed in claim 1 wherein the alkylating agent is methyl iodide.

5. A process as claimed in claim 1 wherein the alkylating agent is butyl bromide.

References Cited in the file of this patent

UNITED STATES PATENTS 2,797,217    Safir et al.  ---------- June 25, 1957

OTHER REFERENCES

Fusco et al.: Chem. Abstracts, volume 52, pages 11853–4 (1958), abstracting Farmaco (Pavia) Ed. Sci., volume 12, pages 823–35 (1957).